UNITED STATES PATENT OFFICE.

KRISTIAN BIRKELAND, OF CHRISTIANIA, NORWAY.

PROCESS OF UTILIZING NITROUS GASES.

948,158.  Specification of Letters Patent.  Patented Feb. 1, 1910.

No Drawing.  Application filed August 9, 1907. Serial No. 387,814.

*To all whom it may concern:*

Be it known that I, KRISTIAN BIRKELAND, a subject of the King of Norway, residing at Christiania, Norway, have invented certain new and useful Improvements in Processes of Utilizing Nitrous Gases; and I do hereby declare the following to be a full, clear, and exact description of the invention, such as will enable others skilled in the art to which it appertains to make and use the same.

My invention relates to a process of absorbing nitrous gases, for the purpose of chemically combining the nitrous gases in such a way as to obtain valuable products for agricultural and other purposes.

According to my invention I use as obsorbent a cyanamid (preferably cyanamid of calcium).

When nitrous gases containing fumes of nitric acid, mixed with other nitrogen oxids, air and water (steam), in proper proportions, are brought into contact with cyanamid of calcium, a chemical reaction will take place. This chemical reaction may be expressed theoretically by the following equations:

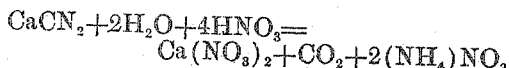
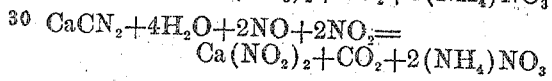

$$CaCN_2 + 2H_2O + 4HNO_3 = Ca(NO_3)_2 + CO_2 + 2(NH_4)NO_3$$

$$CaCN_2 + 4H_2O + 2NO + 2NO_2 = Ca(NO_2)_2 + CO_2 + 2(NH_4)NO_3$$

As will be seen from the first of these equations, there is formed a product constituting a compound of calcium nitrate and ammonium nitrate. To this comes in the practical embodiment of the process, when different oxids of nitrogen are present, a quantity of nitrite.

The percentage of nitrogen of the compound will in the practical embodiment of the process be upward of 25%, and by this process I succeed in making use of all the valuable properties of the cyanamid of calcium, at the same time avoiding the bad properties of this substance, for instance its propensity to developing hydric phosphid. The compound thus formed is completely preservable and has properties making it a very valuable fertilizer, the obtaining of such products being one of the objects of my invention.

I have generally used the cyanamid of calcium mixed with water to a thick paste. It may, however, also be used dry, in which case steam is preferably blown into the absorption chamber.

Another object of my invention is to use the compound formed in the way above specified—(and containing for instance calcium nitrate and ammonium nitrate) for manufacturing nitric acid, (whereby is simultaneously obtained certain valuable by-products), and for extracting the ammonium nitrate. For this purpose I preferably carry out my process in the following manner: To a solution of the above mentioned product is added ammonium sulfate, whereby the lime is deposited in form of hydrated sulfate of lime, and the solution left will essentially consist of ammonium nitrate, which in itself is a valuable product. In order to produce nitric acid I concentrate the solution of ammonium nitrate by evaporation and add sulfuric acid, whereupon I distil the mixture thus obtained, whereby nitric acid is distilled off, while ammonium sulfate is left. This ammonium sulfate may partly be used in carrying out the above process, as explained in the foregoing, and the remainder may be disposed of as a valuable fertilizer.

I may of course also carry out the above process without first depositing the hydrated sulfate of lime by aid of ammonium sulfate, merely treating the compound in question with sulfuric acid and distilling off the nitric acid. I in this case obtain as a by-product a mixture of gypsum and ammonium sulfate, which also constitutes a valuable fertilizer.

I claim.

1. A process of utilizing nitrous gases comprising the step of bringing said gases into contact with an absorption material containing a cyanamid in the presence of water.

2. A process of utilizing nitrous gases comprising the step of bringing said gases into contact with calcium cyanamid in the presence of water.

3. A process of utilizing nitrous gases comprising the step of leading nitrous gases of the class set forth into contact with calcium-cyanamid in the presence of water, dissolving the product in water and adding thereto ammonium sulfate thereby precipitating calcium-sulfate and producing a solution of ammonium nitrate.

4. A process of utilizing nitrous gases comprising the step of leading nitrous gases of the class set forth into contact with calcium-cyanamid in the presence of water, dissolving the product in water and adding thereto ammonium sulfate, thereby precipitating calcium-sulfate and producing a solution of ammonium nitrate, which is concentrated by evaporation, treating said ammonium-sulfate with sulfuric acid to obtain nitric acid and ammonium-sulfate.

In testimony that I claim the foregoing as my invention, I have signed my name in presence of two subscribing witnesses.

KRISTIAN BIRKELAND

Witnesses:
HENRY BORDEWICH,
J. E. VACH